3,007,123
TRAVELING FIELD SAMPLER
Howard W. Andrews, Berkeley Heights, and Earl T. Harkless, Morristown, N.J., assignors to Bell Telephone Laboratories, Incorporated, New York, N.Y., a corporation of New York
Filed Mar. 28, 1960, Ser. No. 17,891
1 Claim. (Cl. 333—98)

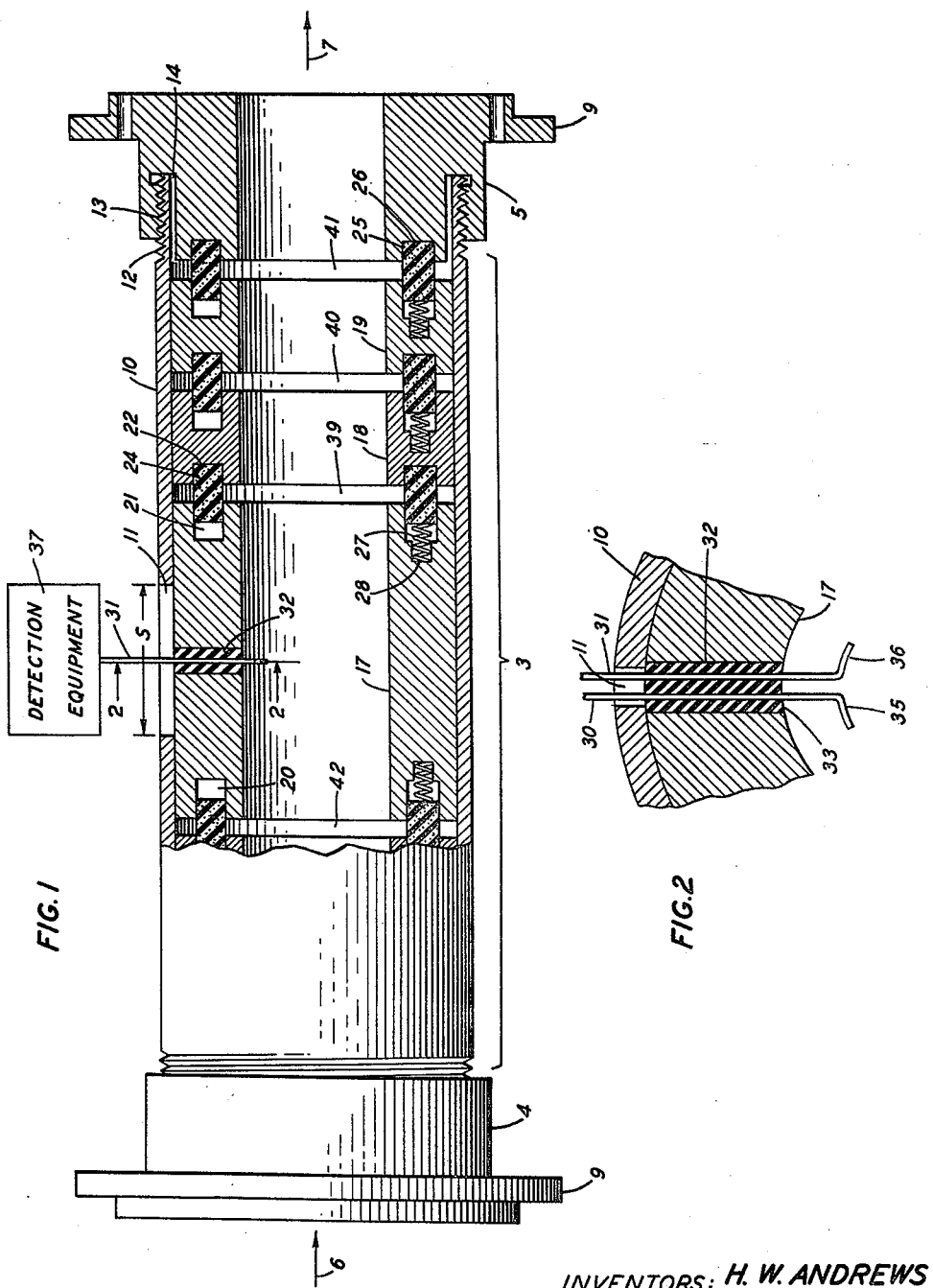

This invention relates to electrical measuring and testing and more particularly to a traveling device for sampling the electromagnetic field within a round wave guide.

An object of the invention is to sample the field in a round wave guide at a point that can be moved longitudinally. Other objects are to increase the accuracy of such measurements, and the convenience of making them.

In wave transmission systems employing wave guides, it is often desired to determine the values of impedances associated with the guide, the frequency of the waves, or the standing wave ratio, or to obtain other pertinent data. Many measurements of this kind depend upon obtaining samples of the electromagnetic field within the guide at different points along the guide. With a rectangular wave guide propagating the $TE_{10}$ mode, a traveling probe projecting into the guide through a centrally located longitudinal slot in a wider wall thereof is satisfactory for this purpose.

However, when the cross section of the wave guide is round, and the propagated wave is the $TE_{01}$ or other $TE_{0n}$ mode, longitudinal slots are not permissible. This is because the magnetic field in the guide produces only circumferential boundary currents which would be interrupted by a longitudinal slot. When a traveling probe is required in these circumstances, it is the present practice to connect the round guide to a rectangular guide through a transducer which converts the $TE_{01}$ mode in the round guide to a $TE_{10}$ mode in the rectangular guide. Since at the center of the broad face there are no transverse currents associated with the $TE_{10}$ mode, a longitudinal slot may be made in the rectangular guide at this point without disrupting the current flow on the wall. A traveling probe is introduced through the slot to obtain the desired field samples. Due to the losses and the unknown mode conversion characteristic and phase shifts associated with the transducer, this sampling method is both inconvenient and inaccurate, especially if a wide frequency band is to be covered.

The traveling field sampler in accordance with the present invention eliminates the transducer entirely and permits a direct measurement of the field in the round wave guide. This is accomplished by connecting a segmented or articulated section in tandem with the rigid, round guide. The segmented section comprises three or more rigid, conductive rings of the same inner diameter as the guide. A probe or other means for sampling the field within the guide are associated with the section, preferably the central ring. A concentric outer cylinder or other means are provided for maintaining the rings and the rigid guide coaxial during longitudinal movements of the central ring. Resilient spacers, which may comprise springs, are inserted between the rings to maintain equal spacing between the rings on either side of the central ring. Thus, if the probe is moved along the guide in one direction, the spaces between the rings on one side thereof decrease but remain equal as the spaces between the rings on the other side increase while also remaining equal. A movement of the probe in the opposite direction has an opposite effect on the ring spacings. If the maximum ring spacing is kept within prescribed limits, the segmented section has little effect on the propagation of energy through the guide. Means are included for reducing the undesired electrical effects of the spaces between the rings or between the end ring and the rigid guide. Lossy material may be inserted in these spaces for this purpose.

The nature of the invention and its various objects, features, and advantages will appear more fully in the following detailed description of a typical embodiment illustrated in the accompanying drawing, of which FIG. 1 is an enlarged side view, partly in section, of a traveling field sampler for round wave guide in accordance with the invention; and FIG. 2 is a partial transverse sectional view taken at the line 2—2 in FIG. 1.

In FIG. 1, a segmented section 3 of round wave guide is connected in tandem between two rigid end sections 4 and 5. Electromagnetic wave energy of the $TE_{01}$ or other $TE_{0n}$ mode is introduced at one end, as indicated by the arrow 6, and extracted at the opposite end, as indicated by the arrow 7. Each of the end sections 4 and 5 has an annular flange 9 at its outer end to facilitate connection to a round wave guide leading to the energy source or to the load. The sections 4 and 5 are connected by an outer metallic cylinder 10 which has a centrally positioned longitudinal slot 11. Each end of the cylinder 10 has threads 12 which engage corresponding threads 13 on one side of an annular groove 14 in the inner end of an end section 4 or 5.

The intermediate section 3 includes at least three rigid, conductive rings such as 17, 18, and 19, with the same inner diameter as that of the end sections 4 and 5 and an outer diameter slightly less than the inner diameter of the outer cylinder 10 to provide a freely sliding fit. The embodiment shown has five such rings. These are the wider central ring 17, two rings 18 and 19 to the right thereof, and two more to the left thereof similar to 18 and 19. Each of the rings has an annular groove in each of its ends. These grooves in the central ring 17 are designated 20 and 21. Each adjacent pair of grooves such as 21 and 22 is partly filled with a ring 24 of very lossy material to absorb the propagated energy which enters the spaces between the rings. Each end section 4 and 5 also has an annular groove 25 and an associated lossy ring 26 to absorb the energy entering between the end section and the end ring 19.

Three helical springs such as 27 spaced at 120-degree intervals press against the left side of the ring 24 to hold it against the bottom of the groove 22. In order to keep the springs 27 in the proper position, each is secured in a circular hole 28 in the bottom of the groove 21. The central ring 17 has six springs 27, three in the left groove 20 and three in the right grove 21.

The electromagnetic field within the wave guide is sampled by means of two conductive probes 30 and 31, best shown in FIG. 2. These project into the intermediate section 3 through a hole 32 in the central ring 17. The hole 32 is filled with insulating dielectric material 33 which surrounds and secures the probes 30 and 31. The inner ends 35 and 36 of the probes are bent in opposite directions to form arcs which are concentric with the ring 17. The other ends of the probes 30 and 31 connect to suitable detection equipment, represented by the block 37, which may move with the probes.

The length S of the slot 11 is determined by the wavelength $\lambda$ of the energy within the section 3 at the center of the frequency band to be covered. Usually, S is made equal to at least $\lambda/2$. The central ring 17 preferably has a length of at least 2S, so that it will close the bottom of the slot 11 at all positions of the probes 30 and 31. The other rings, such as 18 and 19, may be shorter.

However, the length of each of the rings 17, 18, and 19 is preferably made approximately equal to an odd integral number of quarter wavelengths at the midband frequency to minimize the effects of reflections at the spaces between the rings.

The traveling field sampler is shown in its relaxed position, with equal spacings between all the rings and between the end ring 19 and end section 5. All of the springs 27 are in normal compression. Now, assume that the probes 30 and 31 are moved to the right along the slot 11. The rings 17, 18, and 19 will also move to the right and the spaces 39, 40, and 41 will decrease. However, the springs on the right side will tend to assume equal compressions, thus approximately equalizing the spaces 39, 40, and 41. At the same time, the spaces such as 42 on the left side will increase, but as the compressions on the left springs equalize, these spaces will also become approximately equal. If the probes 30 and 31 are moved to the left, the opposite reactions occur. For best results, the maximum spacing should not exceed a small fraction of a wavelength within the guide. It has been found that such small, substantially equal spaces have almost negligible effect upon the propagation of energy through the segmented section 3. If the probes are required to travel a greater distance, of course more conductive rings, lossy rings, and associated springs may be added on both sides.

It is to be understood that the above-described arrangement is only illustrative of the application of the principles of the invention. Numerous other arrangements may be devised by those skilled in the art without departing from the spirit and scope of the invention.

What is claimed is:

A device for sampling the electromagnetic field in a round wave guide comprising two rigid end sections of round wave guide and an intermediate section connected therebetween, the intermediate section comprising a rigid, metallic outer cylinder interconnecting the end sections, at least three rigid, conductive rings slidably fitted into the cylinder and concentrically positioned with respect to the end sections, resilient means between the rings and between each end ring and the adjacent end section, means for absorbing the energy entering between the rings or between the end rings and the end sections, and field-sampling means associated with the central ring, the rings having the same inner diameter as that of the end sections and the resilient means being adapted to maintain the spacings between adjacent pairs of rings on each side of the central ring substantially constant when the central ring is moved along the cylinder.

References Cited in the file of this patent

UNITED STATES PATENTS

| | | |
|---|---|---|
| 2,528,248 | Schlafly | Oct. 31, 1950 |
| 2,555,118 | Coyle et al. | May 29, 1951 |
| 2,837,723 | Krantz et al. | June 3, 1958 |

FOREIGN PATENTS

| | | |
|---|---|---|
| 567,287 | Great Britain | Feb. 7, 1945 |
| 910,174 | Germany | Apr. 29, 1954 |
| 940,051 | Germany | Mar. 8, 1956 |
| 940,120 | Germany | Mar. 8, 1956 |